D. C. CANNELL.
Car Coupling.
No. 64,071. Patented Apr. 23, 1867.
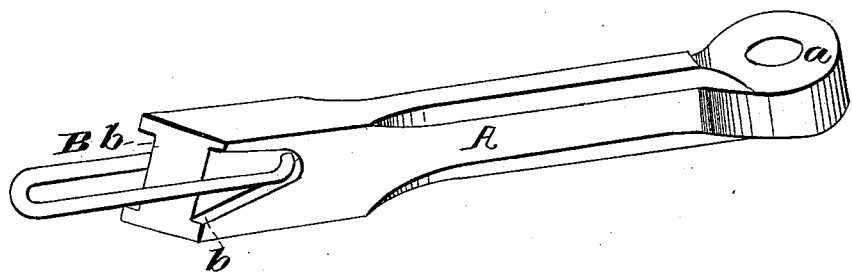

United States Patent Office.

DANIEL C. CANNELL, OF LAFAYETTE, INDIANA.

Letters Patent No. 64,071, dated April 23, 1867.

IMPROVED DRAW-BAR FOR LOCOMOTIVES.

The Schedule referred to in these Letters Patent and making part of the same.

TO ALL WHOM IT MAY CONCERN:

Be it known that I, DANIEL C. CANNELL, of Lafayette, Tippecanoe county, and State of Indiana, have invented a new and improved Draw-Bar for Locomotives and Cars; and I do hereby declare that the following is a full, clear, and exact description thereof, which will enable others skilled in the art to make and use the same, reference being had to the accompanying drawing, forming part of this specification.

The drawing represents a perspective view of my invention.

This invention has for its object the constructing and arranging of a link and draw-bar in such a manner that a sufficient degree of vertical adjustment will be allowed the link to admit of it being adapted to car platforms of different heights, thereby preventing the breaking of bumpers, a contingency of frequent occurrence with the ordinary draw-bar.

A represents the draw-bar, constructed of iron, and provided with an eye, $a$, at one end, through which a pin passes to secure it to the locomotive or car. At the opposite end of the draw-bar a V-shaped recess, $b$, is formed in each side of it; and through the draw-bar, at the inner angular ends of the recesses, a hole is made, in which a link, B, is fitted, said link working within the recesses, so that the latter will limit the play or movement of the link in a vertical direction. This link, in consequence of being allowed this vertical adjustment, may be raised and lowered to suit car platforms of different heights, and hence the breaking of bumpers will be avoided, and cars having platforms of different heights coupled together without any difficulty whatever.

Having thus described my invention, I claim as new, and desire to secure by Letters Patent—

A draw-bar, A, provided at one end with V-shaped recesses $b$, one at each side, with a link, B, fitted in it, and working within the recesses, substantially in the manner as and for the purpose set forth.

DANIEL C. CANNELL.

Witnesses:
JAMES M. BRYAN,
WM. H. BRYAN, Jr.